(12) United States Patent
Andrieu et al.

(10) Patent No.: US 7,247,347 B2
(45) Date of Patent: Jul. 24, 2007

(54) METHOD OF COATING AN OPTICAL FIBER

(75) Inventors: Xavier Andrieu, Bretigny sur Orge (FR); Sophie Vanpoulle, Gif sur Yvette (FR)

(73) Assignee: Draka Comteq B.V., Amsterdam (NL)

( * ) Notice: Subject to any disclaimer, the term of this patent is extended or adjusted under 35 U.S.C. 154(b) by 525 days.

(21) Appl. No.: 10/713,000

(22) Filed: Nov. 17, 2003

(65) Prior Publication Data
US 2005/0053785 A1    Mar. 10, 2005

(30) Foreign Application Priority Data
Nov. 18, 2002  (FR)  .................................. 02 14375

(51) Int. Cl.
*B05D 5/06* (2006.01)
(52) U.S. Cl. ................ 427/163.1; 427/162; 427/163.2; 427/168; 427/169
(58) Field of Classification Search ................ 427/162, 427/163.1, 163.2, 168, 169
See application file for complete search history.

(56) References Cited

U.S. PATENT DOCUMENTS 5,485,541 A * 1/1996 Bigley et al. ............... 385/141
5,567,219 A * 10/1996 Vacha et al. .................. 65/432
6,565,775 B2 * 5/2003 Dubois et al. ............. 264/1.24

FOREIGN PATENT DOCUMENTS

| DE | 43 41 217 A1 | 6/1995 |
| EP | 0 501 339 A1 | 9/1992 |
| JP | 54-160587 | * 12/1979 |

OTHER PUBLICATIONS

Patent Abstracts of Japan, vol. 013, No. 482, Nov. 2, 1989 corresponding to JP 01 193706 A (Fujikura Ltd) dated Aug. 3, 1989.
Patent Abstracts of Japan, vol. 017, No. 327, Jun. 22, 1993 corresponding to JP 05 032712 A (Asahi Glass Co Ltd) dated Feb. 9, 1993.

* cited by examiner

*Primary Examiner*—Alain L. Bashore
(74) *Attorney, Agent, or Firm*—Sughrue Mion, PLLC

(57) ABSTRACT

A method of coating an optical fiber includes a step of coating the fiber with a curable coating composition and a step of curing the composition, which contains an unsaturated compound having a double bond and an oxidation catalyst. The curing step includes an in-line first phase consisting in exposing the coated fiber to UV radiation for a time shorter than the time needed for complete curing followed by an off-line second phase consisting in placing the coated fiber in an oxidizing medium in order to complete curing.

14 Claims, 1 Drawing Sheet

METHOD OF COATING AN OPTICAL FIBER

CROSS-REFERENCE TO RELATED APPLICATIONS

This application is based on French Patent Application No. 02 14 375 filed Nov. 18, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of coating an optical fiber with a coating composition that can be crosslinked by ultraviolet (UV) radiation. It relates in particular to a method whereby the fiber can be coated immediately after it is drawn from a preform. The method is intended for coating a thin conductor such as an optical fiber, but can also be used to coat any other type of product, in particular products whose fabrication limits the time available for effecting the crosslinking. The invention further encompasses an optical fiber provided with this kind of coating and a telecommunication cable containing this kind of fiber.

2. Description of the Prior Art

It is well known that an optical fiber is intended to transmit light waves. It consists of an optical core surrounded by an optical cladding. The optical core is intended to guide most of the light waves transmitted by the optical fiber. These two components (the optical core and the optical cladding) constitute the optical portion of the fiber, referred to as the bare optical fiber. This portion is highly sensitive to external disturbances, which can lead to deterioration of its transmission properties, and thus to degraded operation of the optical fiber. To protect the bare fiber from such external disturbances, it is well known to coat the optical cladding with a plastics material protection layer, known as the coating, and possibly consisting of several layers. In order to be able to code or recognize the fiber, the external layer of the coating can be colored or covered with a colorizing layer. This kind of coated fiber is usually intended to be included in a telecommunication cable. A plurality of parallel optical fibers can be combined to form a ribbon. In this case, a covering is provided to hold the fibers together.

The role of the coating is to protect the conductor from external mechanical aggression and penetration of moisture and, where necessary, to provide electrical insulation. The coating protects the conductor from mechanical or chemical aggression liable to cause optical transmission attenuation defects. The coating also accounts for the mechanical properties of the conductor; it must in particular absorb microbends and any stresses. Furthermore, it must provide sufficient fire resistance in the event of fire. The coating must adhere well to the support intended for it. In the case of an optical fiber, the physical properties of the coating must be compatible with the fiber drawing conditions, in particular the fiber drawing speed, and with the final use of the fiber.

The solution used at present to produce the protection layers consists in coating the optical cladding with a curable resin that is optically crosslinked by ultraviolet radiation. In practice, to produce the coating of a conductor, the optical fiber is surrounded with a layer of the composition to be crosslinked in the liquid state, after which the material is solidified by exposure to ultraviolet radiation. To effect the crosslinking, photoinitiator elements are generally introduced into the composition to be cured. Thanks to these photoinitiators, the exposure to ultraviolet radiation causes a photochemical curing reaction that leads to curing of the material. Exposure to ultraviolet radiation is usually effected by means of a monochromatic or quasi-monochromatic source of UV radiation, such as a laser, an excimer lamp, or an arc lamp.

The prior art document DE-41 26 860 describes a method of fabricating an optical fiber ribbon in which parallel and previously coated optical fibers are bonded together using an acrylate-based adhesive. It is specified that the crosslinking of the coating of the fiber by UV radiation is usually effected in an inert gas, because the presence of oxygen has the effect of inhibiting the reaction, but the adhesive bonds badly to the plane and fully cured surface. The document therefore proposes to effect the crosslinking of the coating in the presence of a defined quantity of oxygen so that the surface of the coating remains microscopically tacky and bonds strongly to the adhesive. The filament passes through the installation at a speed of 30 m/min. The composition is cured first in nitrogen, and then the nitrogen is enriched with progressively increasing amounts of oxygen, in the presence of UV radiation.

According to the above document, in order to obtain incomplete curing, oxygen is used to prevent the acrylate groups from reacting with each other. The fiber drawing speeds used at present in the fabrication of optical fibers are much higher (greater than 300 m/min) than those referred to in the above document. At these speeds a complete reaction is no longer possible.

The coating is conventionally applied in a fiber drawing tower in which the optical fiber travels at a speed in the order of 1 000 m/min to 1 200 m/min and as high as 2 000 m/min. At these speeds, crosslinking is necessarily incomplete at the exit of the fiber drawing installation. However, for reasons of industrial cost effectiveness, it is only possible to effect a single pass at high speed in the installation, and this single pass must lead to complete crosslinking of the coating. The problem that arises here is thus the converse problem of accelerating the crosslinking of the coating composition in the installation and enabling the reaction to continue after leaving the fiber drawing installation.

An object of the present invention is therefore to propose a method of coating an optical fiber with a curable composition that can result in complete crosslinking whilst necessitating only a single pass at high speed in the fiber drawing installation.

Another object of the invention is to propose an optical fiber having a cured coating obtained by the above method and a telecommunication cable including this kind of fiber.

SUMMARY OF THE INVENTION

The present invention consists in a method of coating an optical fiber, the method including a step of coating the fiber with a curable coating composition and a step of curing the composition, which contains an unsaturated compound having a double bond and an oxidation catalyst, in which method the curing step includes an in-line first phase consisting in exposing the coated fiber to UV radiation for a time shorter than the time needed for complete curing followed by an off-line second phase consisting in placing the coated fiber in an oxidizing medium in order to complete curing.

The oxidizing medium is advantageously gaseous, which facilitates bringing the fiber into contact with the oxidizing agent. The oxidizing medium is preferably oxygen, and the oxidizing medium is even more preferably air.

During a preliminary step, the ingredients of the composition intended to form the coating of the optical fiber are mixed together. The curable composition obtained in this way is applied to the surface of the optical fiber obtained from a preform. During a first phase of the curing step, the composition is cured by ultraviolet radiation, as known in the art. The time for which the fiber is exposed to this radiation is sufficient to obtain a "touch dry" coating, but nevertheless less than the time necessary for the curing reaction to be completed. The coating is said to be "touch dry" when an acceptable level of performance is achieved, such as resistance to deformation and to external aggression. On leaving the fabrication lines, the fibers are usually wound onto spools in the open air. A second phase of the curing step consists in leaving the coated fibers in contact with an oxidizing agent such as the oxygen of the air in order for curing to continue off-line. During this second phase, an oxypolymerization reaction occurs thanks to the presence of a catalyst in the composition. The catalyst operates by promoting absorption of oxygen into the coating film; it catalyzes the formation and then the decomposition of peroxides. The presence of unsaturated compounds in the composition enables the curing reaction to occur by opening double bonds and bridging with an oxygen atom.

The oxidation catalyst used is preferably a metal carboxylate obtained by reacting metals or metal derivatives with a natural or synthetic carboxylic acid. The oxidation catalyst is preferably a carboxylate of at least one metal chosen from the group comprising cobalt, manganese, zirconium, calcium, zinc, aluminum, and lithium. The oxidation catalyst is advantageously a mixture of carboxylates of different metals, which may obtain the benefit of their complementary properties. These organometallic salts are often referred to as "dessicants". The catalytic action of these compounds relies on the capacity for the metal ion to change by oxidation from a most stable lower valence state to a less stable higher valence state. Subsequently, by the inverse effect, this generates free radicals on the unsaturated chains, which can then be cured.

The proportion of catalyst is at most equal to 10% by weight of the composition. The proportion of the catalyst is preferably from 0.5% by weight to 10% by weight of the composition, and is more preferably from 0.5% by weight to 5% by weight of the composition. If the coating of the fiber comprises a plurality of layers, the proportion of the catalyst can be the same in all the layers or different in each layer. The oxidation catalyst can also be absent from some layers, in particular the outermost layer.

The unsaturated compound is advantageously chosen from a monomer and an oligomer having an ethylenically unsaturated group such as an acrylate, urethane, etherurethane, vinyl, vinylether, vinylurethane, or acrylamide group. The compound is preferably a urethane-acrylate oligomer or a monomer.

In one embodiment, the composition further contains a photocure initiator. The photoinitiator is naturally chosen to have maximum effectiveness at the wavelengths of the source of UV radiation used. Photoinitiators are molecules able to create free radicals by photoinduced homolytic cleavage. Examples of photoinitiators that can be used include the following commercial products: "IRGACURE® 184", "IRGACURE® 819", "IRGACURE® 1700", and "IRGACURE® 1800".

The first phase of the method according to the invention is carried out at a speed at least equal to 1 000 m/min and preferably at least equal to 1 200 m/min.

The invention also consists in an optical fiber including a cured coating obtained by the method previously described and containing an oxidation catalyst. If the coating of the fiber includes a plurality of layers formed from crosslinkable compositions that can be similar or different, the oxidation catalyst is contained in at least one of the layers, but can also be present in a plurality of those layers.

The invention further consists in a telecommunication cable including at least one such optical fiber.

Other features and advantages of the present invention will become apparent in the course of the following description of embodiments of the invention, provided by way of illustrative and non-limiting example, and from the accompanying drawing.

DETAILED DESCRIPTION OF THE PREFERRED EMBODIMENT

Figure 1:
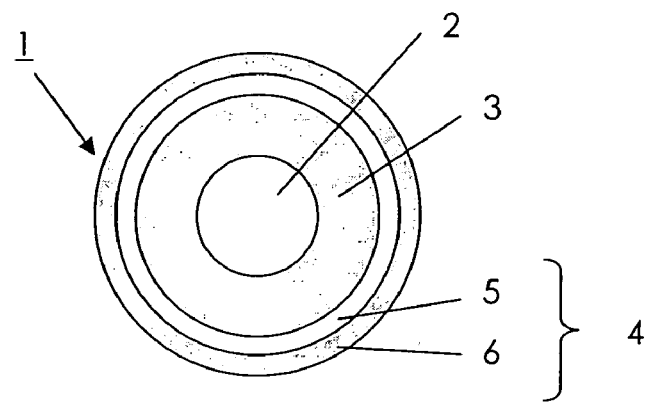
FIG. 1 is a diagrammatic view in section of an optical fiber.

The optical fiber 1 shown in FIG. 1 has an optical core 2 of a material based on silica surrounded by an optical cladding 3, also of a material based on silica. The fiber 1 is coated with a coating 4 including a first plastics material protection layer 5 called the primary coating. On top of the primary coating 5 is a second protection layer 6 called the secondary coating. Between the internal layer 5 and the external layer 6 there can be other intermediate protection layers. In order to be able to code or recognize the fiber 1, the secondary coating 6 is colored, but could equally well be covered with a colored layer. The primary coating 5, the secondary coating 6, and any intermediate layers consist of a polyurethane acrylate type material containing a carboxylate of cobalt, manganese, zirconium, or calcium.

Figure 2:
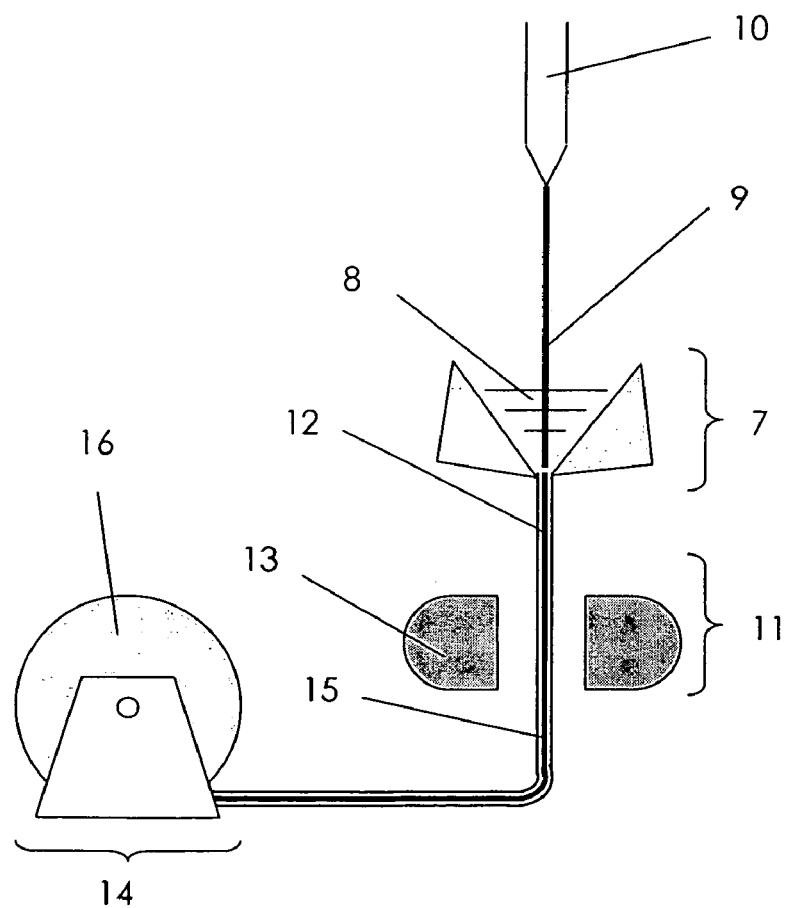
FIG. 2 is a diagrammatic view of an installation for coating optical fibers.

FIG. 2 shows a portion of a fiber drawing tower including in particular:
  a coating station 7 for applying a curable composition 8 to a bare fiber 9 obtained from a preform 10,
  a curing station 11 for curing the coated optical fiber 12 and including a source 13 of ultraviolet radiation, and
  a spooling station 14 for spooling the coated fiber 15 onto a spool 16.

To produce the primary coating 5, the bare optical fiber 9 resulting from drawing the preform 10 is guided toward the coating station 7. A coating composition 8 having a known composition, for example "AFC3™", is prepared containing an oxidation catalyst in the form of a carboxylate of cobalt, manganese, zirconium, and/or calcium.

The coating composition 8, maintained at a temperature at which it is in the liquid state, is fed under pressure through passages into an annular chamber whence it is sprayed radially onto the optical fiber 9. Apparatus has been developed for coating optical fibers that caters for the fact that it is essential that the optical fiber does not touch any solid surface before or during the coating operation.

The optical fiber 12 coated with the composition 8 to be cured then passes through the curing station 11 and in front of a UV lamp 13 at a speed of the order of 1 200 m/min (approximately 20 m/sec). These speeds are such that the coated fiber 12 is exposed to the UV radiation for approximately one tenth of a second. The partly cured primary coating 5 is then allowed to cool in air. The installation can further include a cooling station (not shown) between the curing station 11 and the spooling station 14.

The production of the successive coating layers necessitates the presence of a coating station and a curing station (not shown), and possibly a cooling station, for each of the layers successively deposited.

The secondary coating 6 is produced in a similar manner to that previously described for the primary coating 5, using an "AFC3™" coating composition similar to that of the primary coating layer 5 but having a Young's modulus 50 to 100 times higher, containing no oxidation catalyst, and further containing a colored pigment. Provided with its secondary coating 6, the coated fiber 15 is fed to a spooling station 14 in which it is spooled onto a spool 16 and left in the open air. Thanks to the presence of an oxidation catalyst, curing continues and the curing of the coating 4 is completed in one hour to a few days.

In another embodiment of the invention, the primary coating is obtained in the manner previously described using the same composition as that of the above coating 5. The secondary coating is obtained from a coating composition similar to that of the above coating 6 but further containing an oxidation catalyst.

The invention claimed is:

1. A method of coating an optical fiber, comprising the following steps:
   coating said fiber with a curable coating composition; and
   curing said composition, which contains an unsaturated compound having a double bond and an oxidation catalyst, wherein said curing step includes an in-line first phase of exposing said coated fiber to UV radiation for a time shorter than the time needed for complete curing followed by an off-line second phase of placing said coated fiber in an oxidizing medium in order to complete curing.

2. The method claimed in claim 1 wherein said oxidizing medium is gaseous.

3. The method claimed in claim 2 wherein said oxidizing medium is oxygen.

4. The method claimed in claim 2 wherein said oxidizing medium is air.

5. The method claimed in claim 1 wherein said oxidation catalyst is a metal carboxylate.

6. The method claimed in claim 5 wherein said oxidation catalyst is a carboxylate of at least one metal chosen in the group comprising cobalt, manganese, zirconium, calcium, zinc, aluminum, and lithium.

7. The method claimed in claim 1 wherein the proportion of said catalyst is at most equal to 10% by weight of said composition.

8. The method claimed in claim 7 wherein the proportion of said catalyst is from 0.5% by weight to 10% by weight of said composition.

9. The method claimed in claim 8 wherein the proportion of said catalyst is from 0.5% by weight to 10% by weight of said composition.

10. The method claimed in claim 1 wherein said unsaturated compound is chosen from an acrylate oligomer and a monomer.

11. The method claimed in claim 10 wherein said unsaturated compound is chosen from a urethane-acrylate oligomer and a monomer.

12. The method claimed in claim 1 wherein said composition further contains a photocure initiator.

13. The method claimed in claim 1 wherein said first phase is carried out at a speed at least equal to 1,000 m/min.

14. The method claimed in claim 13 wherein said first phase is carried out at a speed at least equal to 1,2000 m/min.

* * * * *